April 28, 1970    R. F. DEHN    3,509,292
ELECTRICAL DISTRIBUTION SYSTEM
Filed Feb. 21, 1968    5 Sheets-Sheet 1

INVENTOR.
ROY F. DEHN
BY
Watts, Hoffmann, Fisher & Heinke
ATTORNEYS.

April 28, 1970   R. F. DEHN   3,509,292
ELECTRICAL DISTRIBUTION SYSTEM
Filed Feb. 21, 1968   5 Sheets-Sheet 2

INVENTOR.
ROY F. DEHN
BY
Watts, Hoffmann, Fisher & Heinke
ATTORNEYS.

April 28, 1970 R. F. DEHN 3,509,292
ELECTRICAL DISTRIBUTION SYSTEM
Filed Feb. 21, 1968 5 Sheets-Sheet 4

INVENTOR.
ROY F. DEHN
BY
Watts, Hoffmann, Fisher & Heinke
ATTORNEYS.

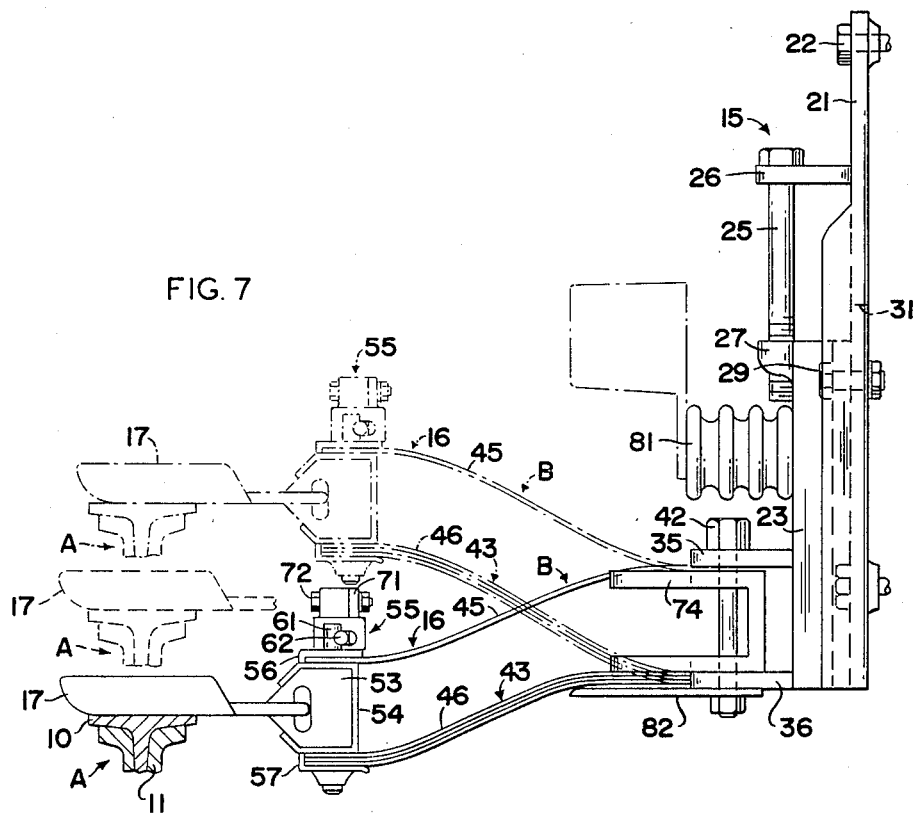

United States Patent Office 3,509,292
Patented Apr. 28, 1970

3,509,292
ELECTRICAL DISTRIBUTION SYSTEM
Roy F. Dehn, Wickliffe, Ohio, assignor to The McNeil Corporation, Akron, Ohio, a corporation of Ohio
Filed Feb. 21, 1968, Ser. No. 707,239
Int. Cl. B60l 5/38; B60g 11/34
U.S. Cl. 191—49                    7 Claims

ABSTRACT OF THE DISCLOSURE

The current collector connectable to a carrier and having a collector shoe for engagement with a third rail supported by a compound elastic support assembly comprising a plurality of elastic support units having different spring constants and values of stiffness such that there will be little, if any, interruption of contact due to irregularness in the rail surface, etc., regardless of the speed of the carrier.

The invention concerns electric power distribution systems utilizing trolley conductors, preferably of the bar or rail-type, sometimes referred to as a "third rail" along which an electric current collector connected to a moving carrier travels and by means of which electric power is transmitted to the carrier. More particularly, the invention concerns the current collector of such a system.

The invention contemplates the provision of a novel and improved electric current collector adapted to be connected to a moving carrier or vehicle and comprising a collector shoe engageable with a trolley conductor, preferably of the bar or rail-type, and carried by a compound elastic support, and that it will operate at high carrier speeds with minimum, if any interruption of contact due to irregularities in the conductor surface, has excellent wear life, no mechanical hinge points employed in its normal operation, and long creep distances thus minimizing leakage of the electric current.

The invention resides in certain constructions and arrangements of parts and further advantages of the invention will be apparent from the following description of the preferred embodiments described with reference to the accompanying drawings forming a part of this specification in which similar reference characters designate corresponding parts, and in which:

FIG. 7 is a diagrammatic view showing the manner in which the current collectors shown in FIGS. 1 to 6 operate.

Figure 1:
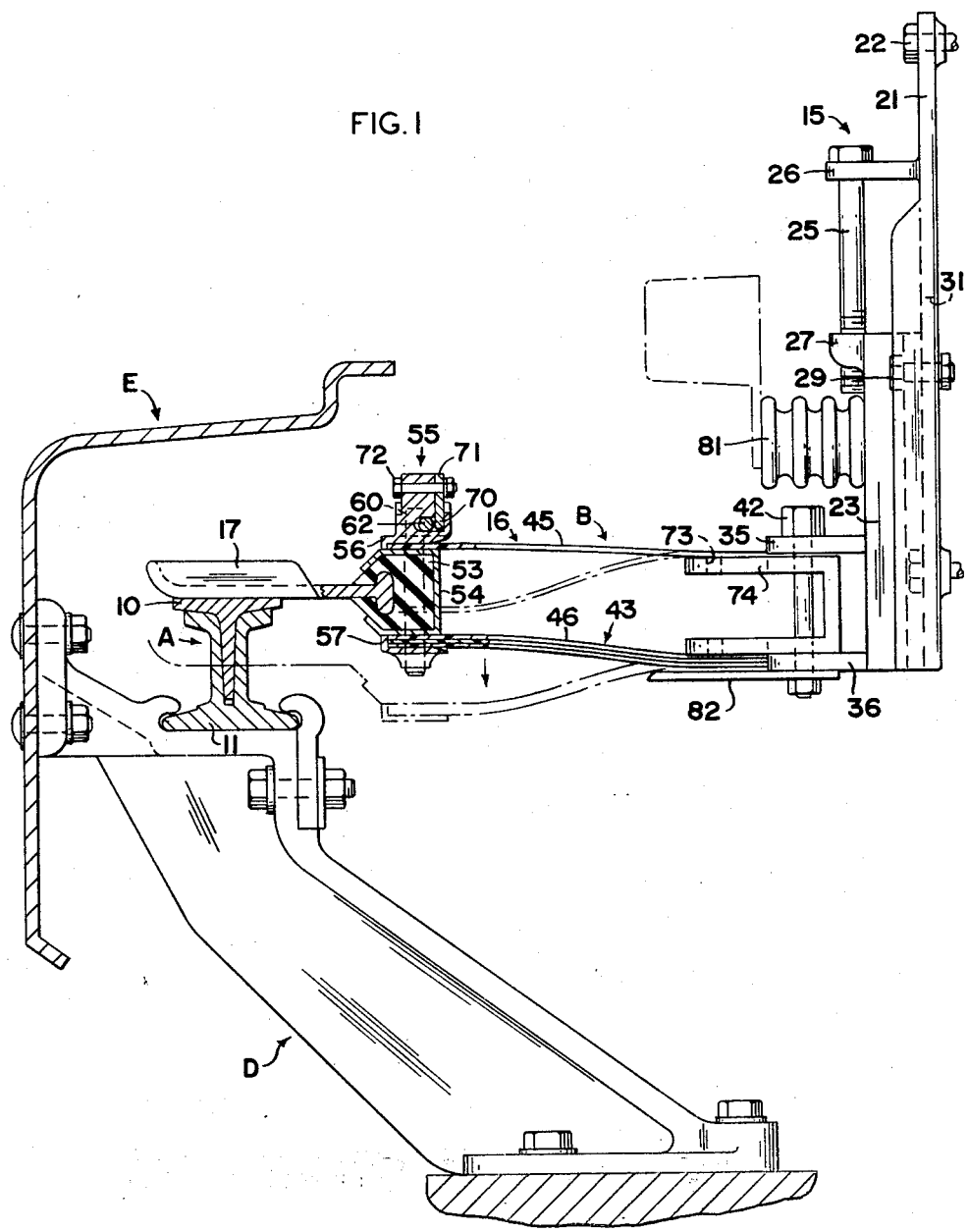
FIG. 1 is a transverse sectional view of a bar or rail-type trolley conductor electrical distribution system including current collector embodying the present invention and taken approximately on the line 1—1 of FIG. 2.
Figure 2:
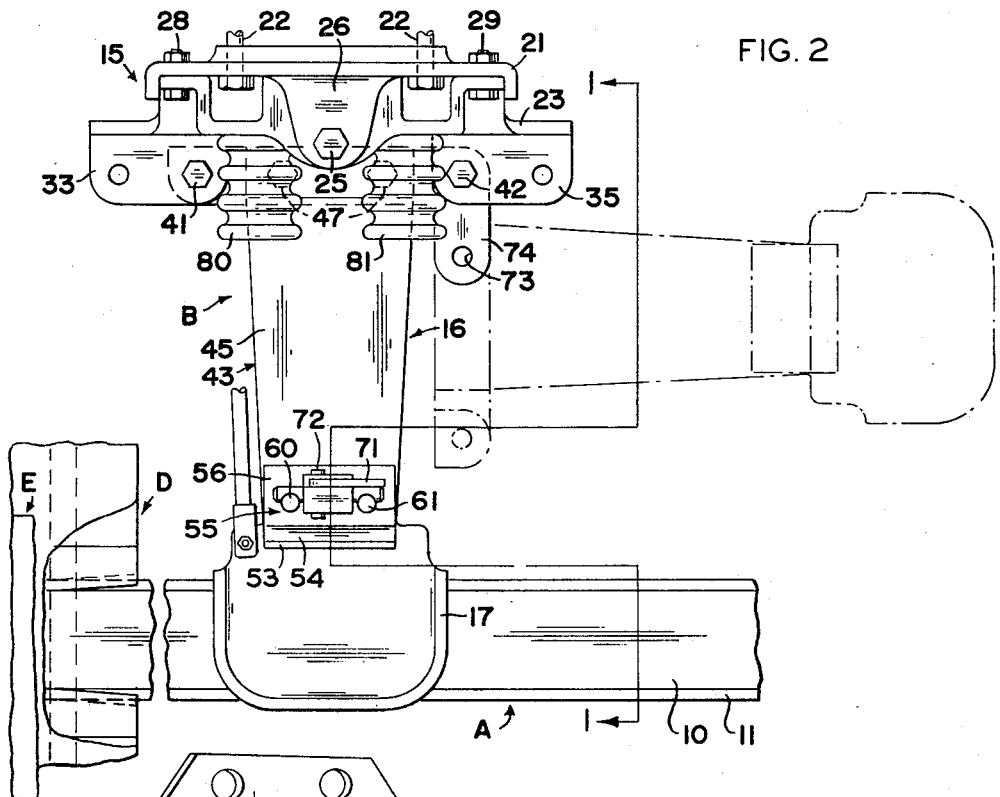
FIG. 2 is a fragmentary plan view of the apparatus shown in FIG. 1.
Figure 3:
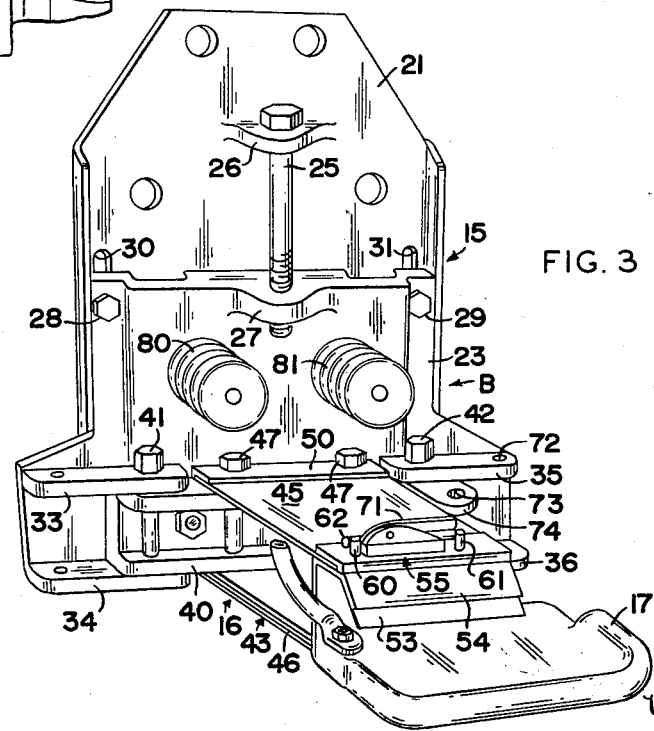
FIG. 3 is a perspective view of the current collector shown in FIGS. 1 and 2.

Referring to the drawings, in which two embodiments of the invention are shown, the reference character A designates generally an electrified conductor or distribution rail, comprising a number of conductor bars or rail sections connected end to end as by means including pairs of splice plates, istalled alongside a railway, not shown, to supply current to electrically powered vehicles on the railway through electric current collector assemblies, only one of which is shown, connected to the vehicles. The current collector shown in FIGS. 1 to 3 is designated generally as B and the collector shown in FIGS. 4 to 6 as C. The rail A is supported at suitable intervals by support assemblies D, only one of which is shown, and is shielded by a protective cover or guard E which extends along the top and the side of the rail A, opposite to that along which the moving carrier travels.

The particular parts of the electrical distribution system thus far referred to, with the exception of the electric current collector assemblies, are well known in the art and forms no part of the present invention and are not herein described in detail.

The rail A is a composite structure comprising a first member 10 having a cross-sectional shape generally similar to that of a T-beam formed of material of high strength and good wearing qualities, for example, steel, and a second member 11 formed of material having relatively high electrical conductivity, for example, aluminum, and having a cross-sectional shape generally similar to that of an I-beam with a medial longitudinal extending slot in one flange side into which the web or stem of the T-shaped member 10 is engaged with the underside of the flange portions thereof engaging the adjoining sides of the adjacent flange portions of the I-shaped member 11. The two members 10 and 11 are preferably made to relatively close tolerances, are tightly pressed together with the adjoining surfaces in intimate contact and may be fixedly connected together at intervals, as by rivets preferably made of material similar to that of which the member 11 is formed.

The collector assembly B, shown in FIGS. 1 to 3, comprises a mounting bracket 15 having connected thereto one end of a compound elastic support assembly 16 and a current collector shoe 17 connected to the opposite end of the support assembly 16. The mounting bracket 15 including a first member 21 adapted to be connected to a carrier as by bolts 22 and a second member 23 connected to the member 21 for adjustment relative thereto in a vertical direction, as viewed in FIGS. 1 and 3 of the drawings. The member 23 is adapted to be adjusted relative to the member 21 by a bolt 25, the head of which bears against the top side of a flange-like projection 26 forming a part of the member 21. The shank of the bolt projects downwardly through the flange 26 and its lower threaded end is engaged in a tapped aperture in a forwardly projecting flange 27 on the upper front side of the member 23. The bolt 25 serves to adjust the member 23 vertically relative to the member 21. The member 23 can be secured in any adjusted position on the member 21 by a pair of bolts 28 and 29, extending through vertically elongated slots 30, 31 in the member 21 and suitable round apertures in the member 23.

The member 23 has two pairs of forwardly projecting, spaced flanges 33, 34 and 35, 36 on opposite ends of the front face thereof between which a base member 40 of the compound resilient support assembly 16 is supported for pivotal movement about a vertical axis. The member 40 is shaped generally like a channel with the sides thereof engaging between the adjoining sides of the pairs of flange members 33, 34 and 35, 36, and is removably secured therebetween with its open side facing forwardly by bolts 41 and 42 extending through the flanges 33 and 35, respectively, and through the upper and lower sides of the member 40 and having their lower ends threaded into suitably tapped holes in the lower flange members 34 and 36, respectively.

The compound resilient support assembly 16 comprises a first resilient support or spring unit 43 comprising two spring members 45 and 46, one secured to each of the opposite sides of the member 40 between the flanges 33, 34 and 35, 36 of the member 23 by suitable bolts 47 and 48. The spring members 45 and 46 are of the leaf type and are preferably made of resilient fiber glass, and metal plates 50 are employed therebetween and the heads and nuts of the bolts 47 and 48. Only the top plate 50 appears in the drawings. The spring members 45 and 46 project from the member 40 in a direction generally normal to the direction in which the member 23 is adjustable relative to the member 21 and the projecting ends thereof carry the current collector shoe or contact member 17, one end of which is embedded in a rubber or rubber-like member 53 secured between the projecting ends of the spring members 45 and 46. The rubber member 53 constitutes the second resilient support or spring unit and is enclosed on three sides by a stainless steel member 54 having flanges along the fourth side thereof which project slightly over the fourth side of the rubber member 53. The adjacent sides of the springs 45 and 46 engage directly against the opposite top and bottom sides of the stainless steel member 54, which with the rubber member 53 are removably clamped to the spring members by a clamp 55 comprising top and bottom clamp members 56 and 57 engaging the top side of the spring 45 and the underside of the spring 46 and adapted to be drawn towards one another by spaced pins 60 and 61 fixed to the bottom clamp member 57 and projecting upwardly through the members 53 and 54 and the top clamp member 56. Opposite ends of a round bar 62 located in a slot 63 in the upper clamp member 56 engage in slots in the projecting upper ends of the pins 60 and 61, the lower surfaces of which are inclined such that when the bar is forced forwardly in the clamp member 56, which is towards the left, as viewed in FIG. 1, by a cam projection 70 on a lever 71 pivoted to the clamp member 56 by a bolt 72, the two clamp members 56 and 57 are drawn towards one another. A pin 73 fixed to the bar 62 and projecting forwardly through an aperture in the upper clamp member 56 allows the pin to slide in the clamp member but prevents its rotation.

In the preferred embodiment of the invention shown, the spring member 45 consists of a single leaf and the spring member 46 of three leaves. This is the preferred construction. It is to be understood, however, that any desired number of leaves may be employed in the respective leaf spring assemblies and that they may be of any desired suitable flexibility, etc. The spring units are normally biased in a downwardly direction, as viewed in FIGS. 1 and 3, and the downward movement of the free end of the collector, including the current collector shoe 17, is limited by a plate-like member 80 secured by the bolts 47 and 48, to the underside of the member 40 and projecting toward the collector shoe 17 so as to limit the downward movement of the resilient support unit 43.

The current collector shown in the preferred embodiment is constructed so that the member 40 and the parts carried thereby can be rotated about the bolt 42 upon removal of the bolt 41 so as to move the contact member or shoe 17 to an inoperative position, that is, to the position shown in phantom lines in FIG. 2. When rotated to the inoperative position, the contact shoe can be held in said position by inserting the previously removed bolt 41 through aligned holes 72 and 73 in the flange 35 and a projecting member 74 formed integral with the top side of the member 40. The lower end of the bolt is threaded into a suitable tapped aperture in the flange member 36 which aperture is aligned with the aperture 72 in the upper flange member 35. When it is desired to return the contact member 17 to operating position the bolt 41 is removed from the holes 72 and 75, the member 40 rotated to the position shown in full lines, and the bolt 51 reinserted through the aligned apertures, previously referred to.

The current collector shown is also adapted for either right-hand or left-hand running, that is, the member 40 and the parts associated therewith can be removed, disassembled and reassembled so that the arm or member 74 is on the left-hand side of the spring members, as viewed in FIGS. 2 and 3 of the drawings, rather than on the right-hand side, as shown in the drawings.

The reference characters 80 and 81 designate insulators for the reception of a fuse holder, etc., shown in phantom in FIG. 1. Since the fuse and fuse bracket, etc. form no part of the present invention these parts are not shown nor described in detail.

Figure 4:
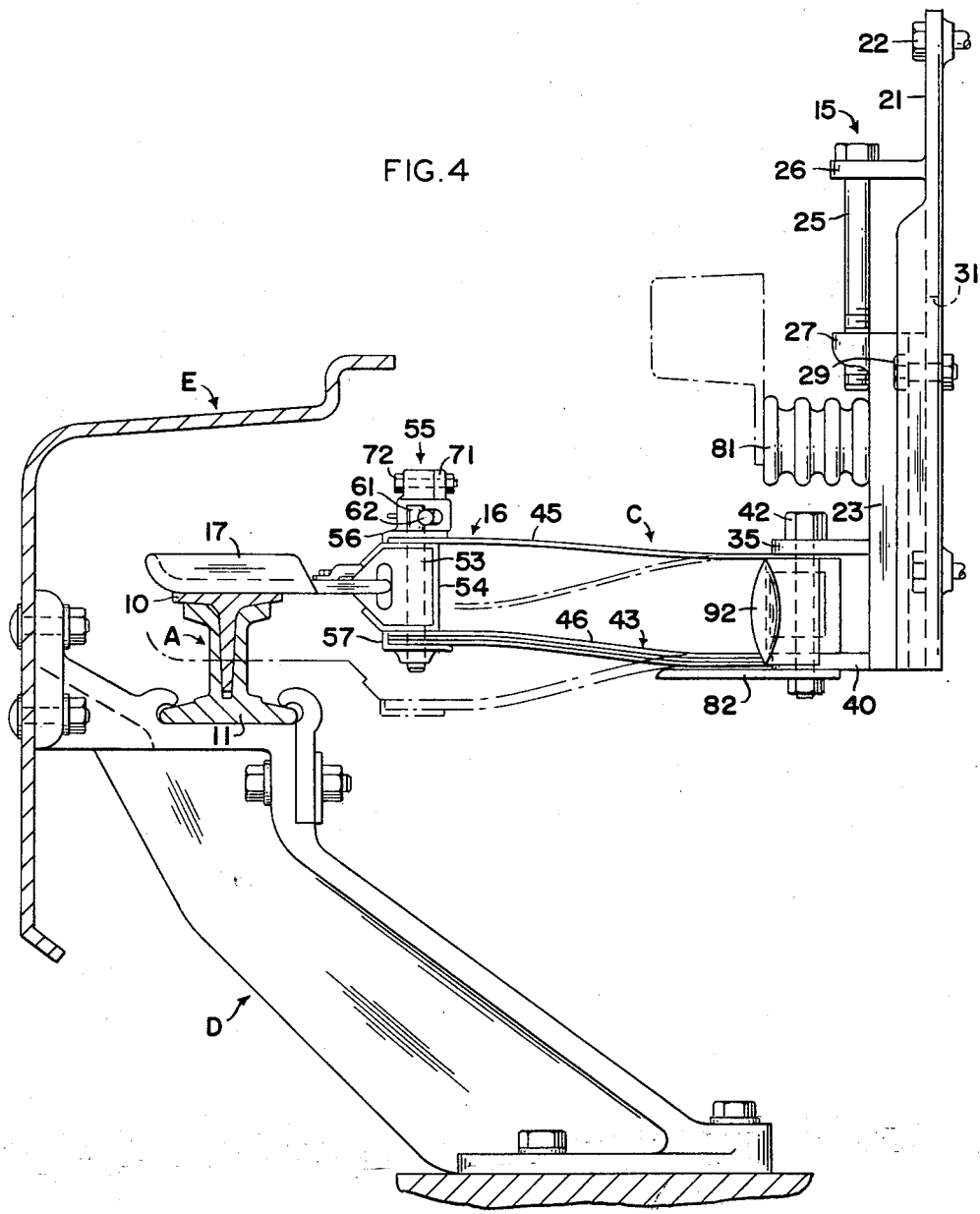
FIG. 4 is a view somewhat similar to FIG. 1, but taken along the line 4—4 of FIG. 5 and showing a current collector of modified construction.
Figure 5:
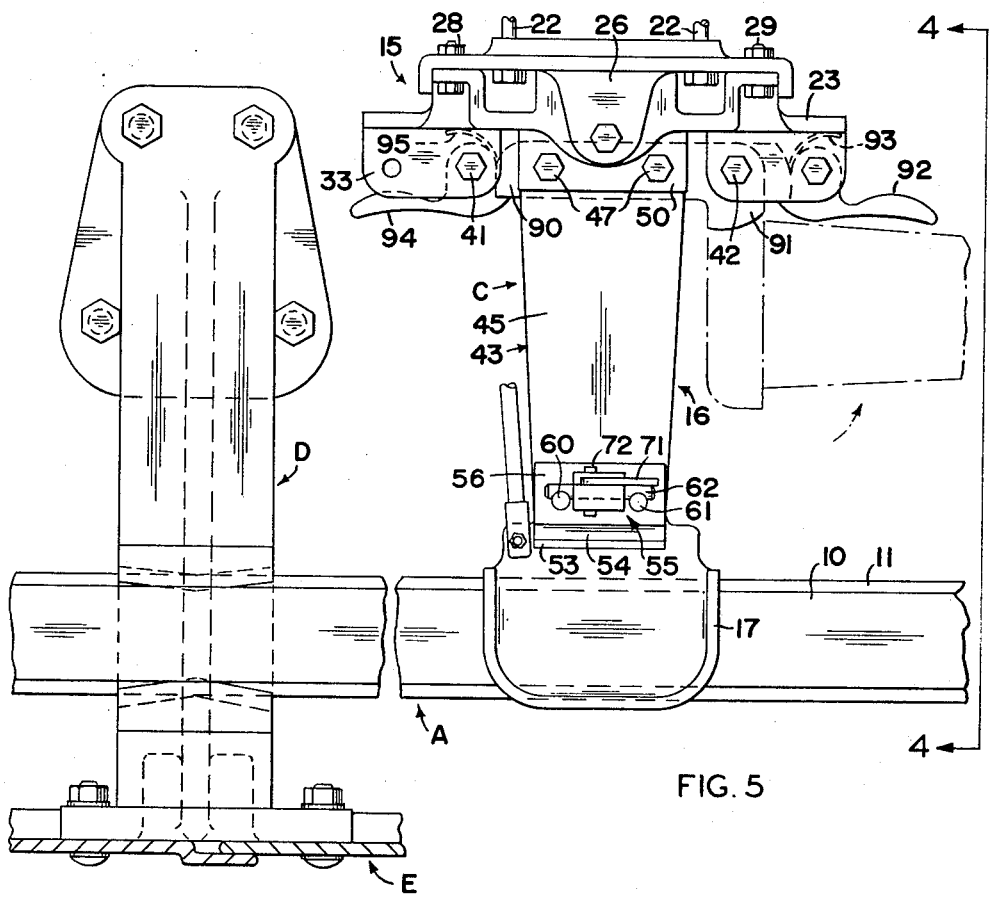
FIG. 5 is a fragmentary plan view of the electrical distribution system shown in FIG. 4.
Figure 6:
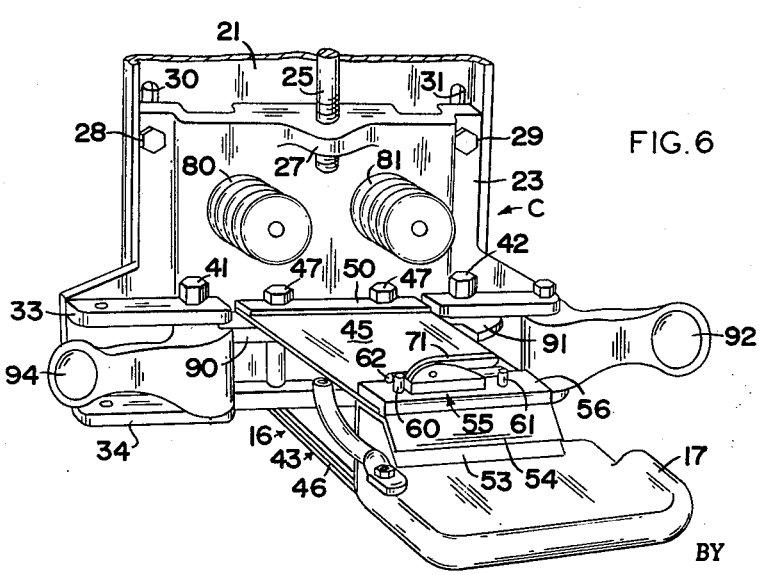
FIG. 6 is a perspective view of the current collector shown in FIGS. 4 and 5.

The apparatus shown in FIGS. 4 to 6 inclusive is similar to that shown in FIGS. 1 to 3, with the exception of the manner in which the pivotable collector shoe unit of the current collector is retained either in its operating or inoperating position, and the duplicate parts are designated by the same reference characters as those employed in FIGS. 1 to 3 inclusive. In view of the similarity of the apparatus shown in FIGS. 4 to 6 to that shown in FIGS. 1 to 3, the apparatus shown in FIGS. 4 to 6 will not be described in detail. Suffice it to say that the right-hand ends of the springs 45, 46, as viewed in FIG. 4, are connected to a channel-shaped member 90 which is similar to the member 40 of the first embodiment except that it is shorter and the forwardly extending projection 91, which corresponds with the projection 74 of the member 40, is also shorter and its left-hand side is adapted to be engaged, when the collector unit is rotated to its inoperative position, that is, the position shown in phantom in FIG. 5, by a shoulder or abutment on a spring-pressed lever 92 pivotally connected to a bolt projecting through the hole 72 in the flange 35 and the aligned hole in flange 36. The lever 92 is biased by the spring 93 in a clockwise direction as viewed in FIG. 5. The collector shoe unit is held in its operating position, that is, in the position shown in full lines in FIG. 5, by a similar spring-pressed lever pivoted to the bolt 41 and biased in a counterclockwise direction by a spring 95. Like the lever 92, the lever 74 has an abutment shoulder which engages against the forwardly extending edges of the upper and lower sides of the channel member 90.

Important features of the present current collectors are the absence of mechanical hinge points in the normal operating parts, the low inertia of the current collector shoe, and the fact that the downward pressure or preload of the contact or collector member or shoe against the distribution rail is a function of the displacement of the contact member or shoe above the rail, which displacement can be readily adjusted.

As the collector shoe travels along the distribution rail the vertical position of its point of contact with the rail relative to a given point on the carrier varies and for the shoe to maintain contact with the rail it is supported for movement relative to the carrier and resiliently urged into contact with the rail. According to the present invention the collector shoe is connected to a carrier mounting bracket by a compound elastic support assembly comprising a plurality of elastic support units, in the present instance two, connected end to end, each having different spring constants, different values of stiffness and/or different natural frequencies of oscillation. In the preferred embodiments shown, the current collector is designed to accommodate variations of one inch up and down from a normal position, in the relative height of the rail and the weight of the collector shoe, see FIG. 7, and the spring constants, spring rate and/or values of stiffness, etc., of the elastic support units 43 and 53 are so chosen that they effect a mass and spring system such that there will be little, if any, interruption of contact due to irregularities in the rail surface, etc., even at high carrier speeds. The more or less parallelogram configuration of the unit 43 maintains the contact surface of collector shoe 17 level or substantially level for different relative heights as is illustrated in FIG. 7. In the construction shown, the ends of the spring members 45 and 46, connected to the membtr 54, are slightly closer together than the other end thereof and the spring members are not pivoted to the members 40 and 54, but are clamped rigidly to said members, and as the contact member rises the spring members bow and rotate the contact member slightly downwardly, that is, counterclockwise. This counteracts the slight rotation of the contact members in its mounting 53. Forces tending to displace the collector shoe 17 from the conductor rail A are first absorbed by the resilient mounting 53 for the collector shoe in the free end of the spring assembly 43. The stresses set up in the different parts of the assembly depends upon the acceleration to which they are subjected and the resilient unit 53 has the proper stiffness, flexibility and movement required to absorb low amplitude vibrations having relative high frequencies. The resilient unit 43, the stiffness of which is softer than that of the unit 53 is relied upon primarily to take care of the lower frequency and high amplitude vibrations. In the case of low amplitude high frequency vibrations, the collector shoe may raise with the conductor rail and return therewith, etc., before little, if any, of the motion is transmitted to the flexible spring unit 43. The collector member, because of this low inertia, merely rotates slightly in its rubber mounting. The design is such that inertial forces tending to displace the collector member are effectively resisted.

From the foregoing it will be apparent that the objects of the invention heretofore enumerated and others have been accomplished and that there has been provided a novel and improved current collector for use in an electric power distribution system, particularly of the third rail type, which current collector has low inertia and will operate at high carrier speeds with minimum, if any, interruption of contact due to irregularities in the conductor surface.

While the preferred embodiments of the invention have been described in considerable detail, it will be apparent that the invention can be otherwise embodied and it is the intention to cover hereby all adaptions, modifications and other aspects of the invention herein referred to which come within the practice of those skilled in the art to which the invention relates.

Having thus described my invention, what I claim is:

1. In a current collector for a third rail-type electric power distribution system, a mounting bracket, a member, means connecting said member to said mounting bracket, leaf-type spring means, means connecting one end of said leaf-type spring means to said member, a resilient rubber-like member connected to the other end of said leaf-type spring means, and a contact member adapted to engage a third rail-type current conductor and travel therealong having its one end embedded in said resilient rubber-like member.

2. In a current collector for a third rail-type electric power distribution system, a member, leaf-type spring means, means connecting one en dof said leaf-type spring means to said member, a mounting bracket, means connecting said member to said mounting bracket in one of a plurality of positions transversely of the direction of flexibility of said leaf-type spring means, a resilient rubber-like member connected to the other end of said leaf-type spring means, and a contact member adapted to engage a third rail-type conductor and travel therealong having its one end embedded in said resilient rubber-like member.

3. In a current collector for a third rail-type electric power distribution system, a member, leaf-type spring means, means connecting one end of said leaf-type spring means to said member, a mounting bracket, means connecting said member to said mounting bracket for adjustment relative thereto in the direction of flexibility of said leaf-type spring means, a resilient plastic member connected to the other end of said leaf-type spring means, and a contact member adapted to engage a trolley conductor and travel therealong having its one end embedded in said resilient plastic member.

4. In a current collector for a third rail-type electric power distribution system, a member, leaf-type spring means, means connecting one end of said leaf-type spring means, means connecting one end of said leaf-type spring necting said member to said mounting bracket for adjustment relative thereto in the direction of flexibility of said leaf-type spring means and in one of a plurality of positions transversely of the direction of adjustment of said member on said mounting bracket, a resilient rubber-like member connected to the other end of said leaf-type spring means, and a contact member adapted to engage a third rail-type conductor and travel therealong having its one end embedded in said resilient rubber-like member.

5. In a current collector for a third rail-type electric power distribution system, a mounting bracket, leaf-type spring means comprising at least two spaced leaf springs, means connecting one end of said leaf-type spring means to said mounting bracket, a resilient plastic member connected to the other end of said leaf-type spring means, and a contact member adapted to engage a rail-type conductor and travel therealong havings its one end embedded in said resilient plastic member.

6. In a current collector for a third rail-type electric power distribution system, a mounting bracket comprising a first member and a second member, means for connecting said second member to said first member for adjustment relative thereto in a generally vertical direction, a third member, means connecting said third member to said second member of said mounting bracket, leaf-type spring means comprising at least two leaf spring members spaced from one another in the direction of said adjustment between said first and second members, means connecting one end of said leaf-type spring means to said third member, a resilient plastic member connected between the other ends of said leaf spring members, and a contact member adapted to engage a rail-type conductor and travel therealong having its one end embedded in said resilient plastic member.

7. In a current collector for a third rail-type electric power distribution system, a mounting bracket comprising a first member and a second member, means connecting said second member to said first member for adjustment relative thereto in a generally vertical direction, a third member, means for selectively connecting said third member to said second member of said mounting bracket in one of a plurality of positions transversely of the direction of adjustment between said first and second members, leaf-type spring means, said leaf-type spring means comprising at least two leaf spring members spaced from one another in the direction of said adjustment between said first and second members, means connecting one end of said leaf spring members to said third member, a resilient rubber-like plastic member connected between the other end of said leaf spring members, and a contact member adapted to engage a rail-type conductor and travel therealong having its one end fixedly embedded in said resilient plastic member.

References Cited

UNITED STATES PATENTS

| | | | |
|---|---|---|---|
| 747,277 | 12/1903 | Udstad | 191—49 |
| 2,973,951 | 3/1961 | Billing | 267—30 |
| 3,089,005 | 5/1963 | Dean et al. | 191—49 |

ARTHUR L. LA POINT, Primary Examiner

C. B. LYON, Assistant Examiner

U.S. Cl. X.R.

267—30